(12) United States Patent
Mahaffy

(10) Patent No.: US 8,182,586 B2
(45) Date of Patent: May 22, 2012

(54) BUBBLE REDUCTION SYSTEM

(75) Inventor: Matthew J. Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 316 days.

(21) Appl. No.: 12/558,671

(22) Filed: Sep. 14, 2009

(65) Prior Publication Data

US 2011/0061535 A1   Mar. 17, 2011

(51) Int. Cl.
*B01D 19/02* (2006.01)

(52) U.S. Cl. .............. 95/242; 95/260; 96/220; 96/176; 96/215

(58) Field of Classification Search ............... 95/262, 95/242, 260; 96/204, 220, 176, 215
See application file for complete search history.

(56) References Cited

U.S. PATENT DOCUMENTS

| | | | |
|---|---|---|---|
| 3,778,976 A * | 12/1973 | Pond | 96/181 |
| 4,100,071 A * | 7/1978 | Beurer et al. | 210/197 |
| 5,174,931 A | 12/1992 | Almquist et al. | |
| 5,922,364 A | 7/1999 | Young, Jr. | |
| 6,607,689 B1 | 8/2003 | Farnworth | |
| 2004/0159967 A1 * | 8/2004 | Farnworth | 264/71 |
| 2005/0040049 A1 | 2/2005 | Volodarsky et al. | |

* cited by examiner

*Primary Examiner* — Duane Smith
*Assistant Examiner* — Douglas Theisen
(74) *Attorney, Agent, or Firm* — Gifford, Krass, Sprinkle, Anderson & Citkowski, P.C.

(57) ABSTRACT

A bubble reduction system for a fluid flowing system is provided. The bubble reduction system can include a vat containing a fluid, a pump operable to pump the fluid into the vat, a moat containing a portion of the fluid and a bubble trap also containing a portion of the fluid. The bubble trap can have an upstream section and a downstream section with a panel located between the two sections.

18 Claims, 4 Drawing Sheets

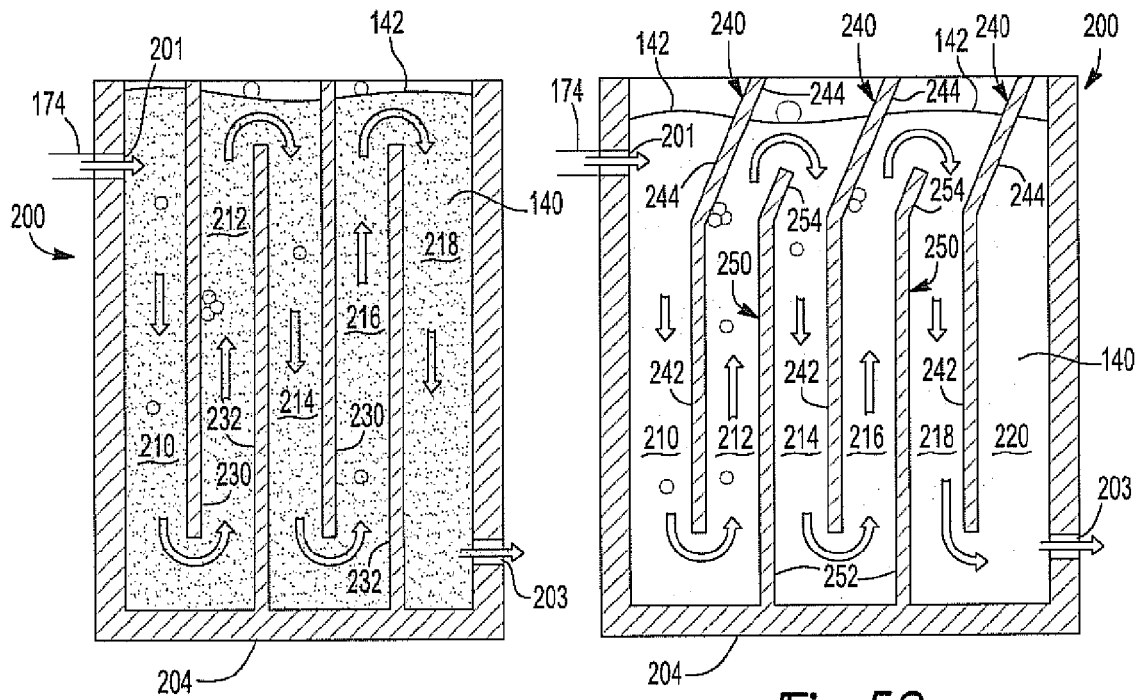
*Fig-5B*
*Fig-5C*
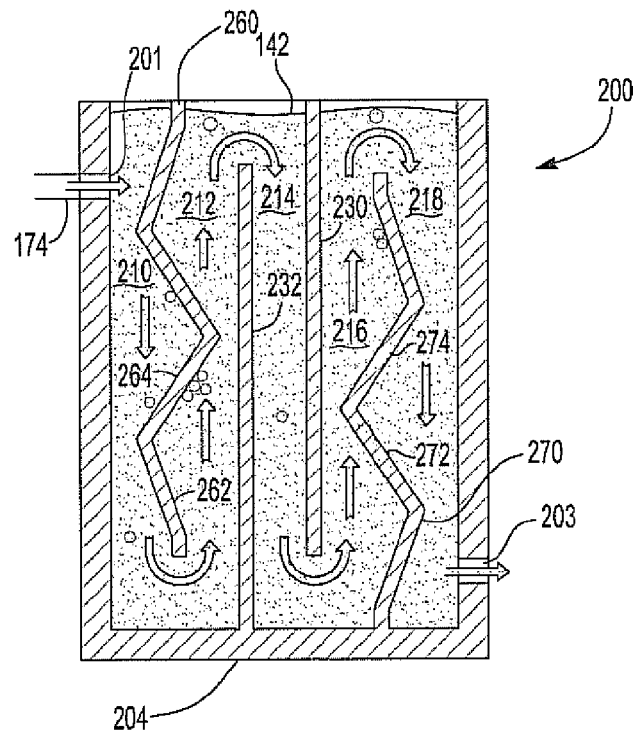
*Fig-5D*

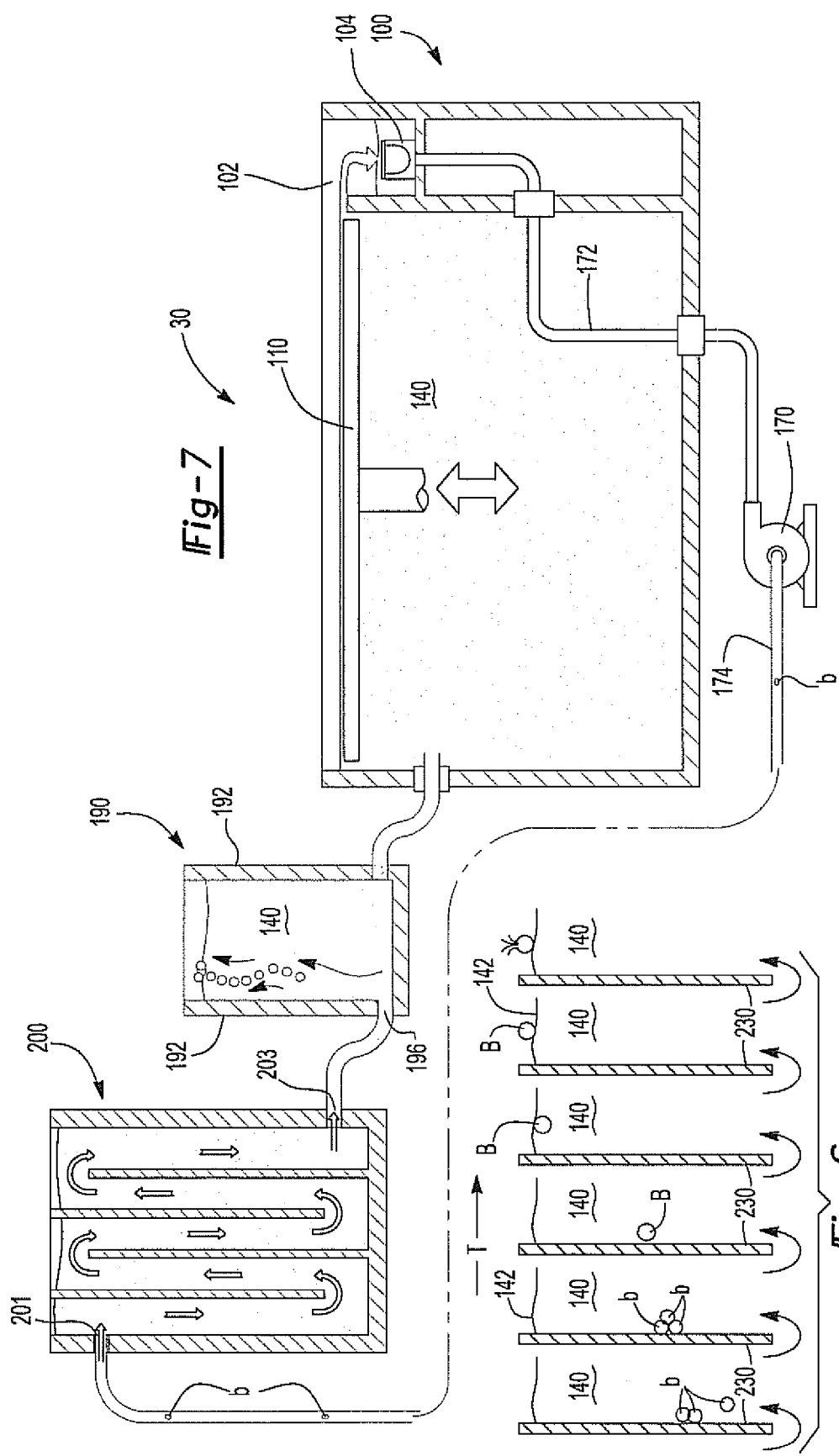

BUBBLE REDUCTION SYSTEM

FIELD OF THE INVENTION

The present invention is related to a bubble reduction system for a fluid flowing system, and in particular, a bubble reduction system that has a bubble trap and a moat.

BACKGROUND OF THE INVENTION

Systems that use the flow of a fluid, for example a liquid, to aid in the fabrication of a component, testing of a component, cooling of a component and the like are known. In addition, systems such as a stereolithography machine, ultrasonic testing probes and the like can exhibit decreased performance when gas bubbles are present in the liquid.

Stereolithography is an additive manufacturing process that incorporates a vat of liquid photopolymer resin and a light source such as a laser to build or fabricate parts, components, etc., one layer at a time. For each layer, the light source can trace a pattern of the part cross-section on the surface of the liquid resin and the exposure of the resin to the light solidifies the resin for that layer. Thereafter, a platform on which the part is located can descend into the vat of liquid by a single layer thickness and the light source can trace the pattern again and thereby solidify the next layer, the next layer also being adhered to the underlying and previously solidified layer. In some instances, a resin-filled blade can sweep across the part cross-section after the platform has descended into the vat by a single layer thickness and thus ensure that the part cross section is uniformly recoated with a fresh layer of the photopolymer resin.

The resin within the vat is typically pumped within a closed-cycle loop such that resin is removed from the vat, passes through a pump and is then re-introduced into the vat. The process of pumping the resin can introduce gas bubbles therewithin which are subsequently transferred into and present in the vat. If a bubble is present on the cross-section of the part when the light source traces the pattern, the bubble cross-section can be cured/hardened and result in a defect of the manufactured component. In addition, a cured/hardened bubble that is present on the top layer of the part can interfere with the resin-filled blade when it sweeps across the part cross section. As such, a bubble can result in the production of a faulty component and/or malfunction of the stereolighography machine such that the process of making the current part or component must be abandoned and the process restarted from the beginning.

Another concern with bubbles and the operation of a stereolithography machine is the fact that the viscosity of the liquid polymer can increase with time of operation and/or number of parts produced by the machine. In addition, as the viscosity increases, bubbles formed during the pumping process are harder to remove and replacement of the liquid is required. It is appreciated that frequent replacement of the liquid polymer can result in a significant increase of the overall cost associate with operating the machine.

With respect to ultrasonic testing, an ultrasonic probe can use water to provide a medium for ultrasonic waves to travel from a piezoelectric transducer to a component being tested. The water can also serve as the medium for the return of an echo wave from the component back to the transducer. In the event that a gas or air bubble is present in the liquid between the transducer and the component, erroneous readings can occur.

The problem with bubbles in such types of systems is known to those skilled in the art and efforts to reduce or eliminate such bubbles have been taken. For example, U.S. Patent Application Publication No. 2004/0159967 discloses a bubble elimination system for use with stereolighography machines in which ultrasonic transducers are used to vibrate the vat of the machine. The vibration is taught to cause bubbles within the vat to dislodge from a structure to which they are adhered to, float to the surface and eventually pop or be removed. However, such a system requires the use and addition of ultrasonic transducers, vibration of the vat tank, both of which can add to the cost, expense and complexity of the machine. As such, a cost-effective, relatively simple bubble reduction system for a fluid flowing system would be desirable.

SUMMARY OF THE INVENTION

A bubble reduction system for a fluid flowing system is provided. The bubble reduction system can include a vat containing a liquid, a pump operable to pump the liquid into the vat, a moat containing a portion of the liquid and a bubble trap also containing a portion of the liquid. The bubble trap can have an upstream section and a downstream section with a panel located between the two sections. The liquid flows from the pump into the upstream section, from the upstream section into the downstream section, from the downstream section into the moat and from the moat into the vat. During the flow of the liquid through the bubble trap, the panel provides a surface upon which gas bubbles can accumulate, coalesce and subsequently float to a top surface of the liquid in the bubble trap and pop/burst. In addition, gas bubbles that do not attach to, accumulate, etc., to the surface of the panel can pass into the moat, float to a top surface of the fluid in the moat and remain within the moat and thus not pass into the vat of fluid. In some instances, the bubbles in the moat can be present as foam.

The vat can be a stereolighography machine vat and the fluid can be a liquid photopolymer. In addition, the moat can have a side wall with a moat discharge opening, the moat discharge opening being located below the top surface of the liquid contained in the moat.

The liquid can flow from the upstream section to the downstream section of the bubble trap by flowing over, under and/or through a top flow panel or a bottom flow panel. The top flow panel is dimensioned such that it has an upper or top surface that is located below the top surface of the liquid in the bubble trap and as such allows for liquid to flow over the surface in order to pass from one section to another. The bottom flow panel is dimensioned such that the fluid cannot flow over it, but must flow from one section to another by passing under or through the panel at a location below and spaced apart from the top surface of the liquid in the bubble trap. The panel can be a generally vertical panel or in the alternative can have a generally vertical portion and a generally sloping portion.

The bubble trap can have an inlet through which liquid flows into the trap and an outlet through which liquid flows out of the trap. In addition, one or more upstream sections and one or more downstream sections can be located between the inlet and the outlet. In some instances, there is a plurality of upstream sections and a plurality of downstream sections located between the inlet and the outlet. In such an instance, the plurality of upstream sections can be separated from the plurality of downstream sections by at least one top flow panel and at least one adjacent bottom flow panel.

The moat can be located at least partially within the vat and may or may not have a top surface of liquid that is at a same level of a top surface of the liquid in the vat. In addition, the bubble trap can be located at least partially with the moat.

A process for reducing bubbles in a liquid flowing system can include providing the bubble reduction system as described above, pumping liquid into the upstream section of the bubble trap and allowing the liquid to flow from the upstream section, to the downstream section, and eventually out of the trap. Pumping of the liquid can result in gas bubbles being present therein and the gas bubbles can coalesce together on a surface of the panel located between the upstream section and the downstream section. A bubble, made from coalesced bubbles or not, can also float to the top surface of the liquid in the bubble trap and pop/burst. In addition, bubbles that are present within the liquid can float to the top surface of the liquid contained in the moat. It is appreciated that liquid that is in the moat can exit the moat and enter the vat.

BRIEF DESCRIPTION OF THE DRAWINGS

FIG. 5B is a side cross sectional view of another embodiment of a bubble trap;
FIG. 5C is a side cross sectional view of another embodiment of a bubble trap;
FIG. 5D is side cross sectional view of another embodiment of a bubble trap;
FIG. 6 is a schematic illustration of bubbles coalescing on the surface of a panel;
and
FIG. 7 is a side cross sectional view of another embodiment of the present invention.

DETAILED DESCRIPTION OF THE INVENTION

Figure 1:
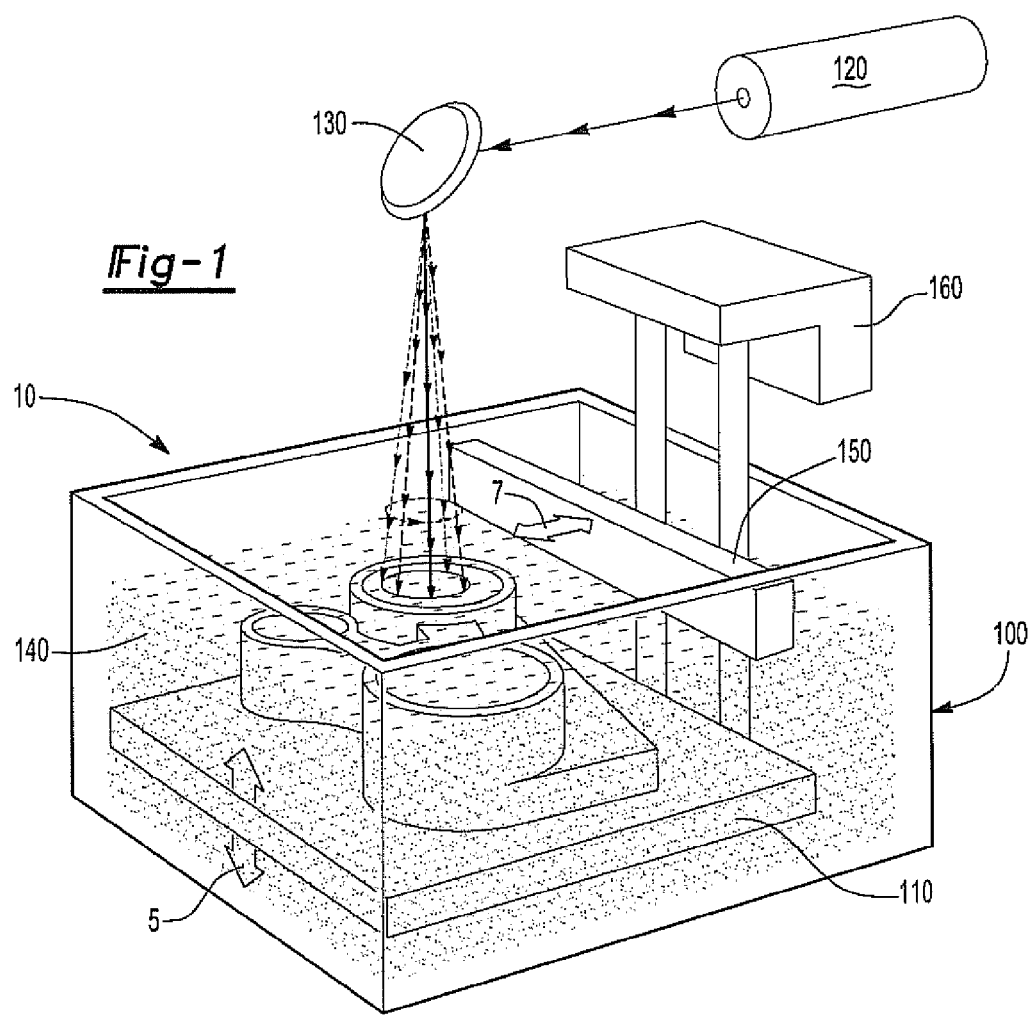
FIG. 1 is a perspective view of a stereolithography machine.

The present invention discloses a system, apparatus, process and the like for reducing bubbles in a fluid flow system. As such, the invention has utility for reducing bubbles in a liquid and providing improved performance of a machine, system and the like.

The bubble reduction system can include a vat containing a liquid, a pump operable to pump liquid into the vat, a moat containing a portion of the liquid and a bubble trap also containing a portion of the liquid. The bubble trap has an upstream section and a downstream section with a panel located between the two sections. The liquid can flow from the pump into the upstream section of the bubble trap, from the upstream section to the downstream section, from the downstream section out of the bubble trap and into the moat, and from the moat into the vat. The panel can provide one or more surfaces that afford bubbles within the liquid to accumulate, coalesce and subsequently float to a top surface of the liquid in the trap. In addition, bubbles that are not removed from the liquid in the bubble trap can float to a top surface of the liquid within the moat and thus be prevented from entering the vat.

In some instances, the vat is a stereolithography machine vat and the liquid is a liquid photopolymer. The liquid photopolymer can be any photopolymer known to those skilled in the art for use in a stereolithography machine, for example and for illustrative purposes only a photopolymer such as REN SHAPE® SL 7580 as provided by Huntsman Advanced Materials located in The Woodlands, Texas. In addition, the stereolithography machine can be any such machine known to those skilled in the art, illustratively including a SCS-9000/9000D stereolithography machine provided by Sony Precision Technology America, Inc. located in Lake Forest, Calif.

The moat can have a side wall with a moat discharge opening, the moat discharge opening being located below the top surface of the fluid contained in the moat. It is appreciated that the moat discharge opening affords for the flow of the fluid from the moat into the vat. In some instances, the moat can be located at least partially within the vat, or in the alternative, located and spaced apart from the vat. In addition, the bubble trap can be located at least partially within the moat, or in the alternative, spaced apart from the moat. If the moat is located at least partially within the vat, the side wall of the moat can extend above a top surface of the liquid in the vat and thus prevent any bubbles that are located on the top surface of the liquid in the moat from passing over or entering into the liquid in the vat.

The panel between the upstream section and the downstream section can be in the form of a top flow panel or a bottom flow panel. The top flow panel can have a top edge or surface that is located below and is spaced apart from the top surface of the liquid contained in the bubble trap. As such, the fluid can pass or flow over the top edge or surface of the top flow panel in order to pass or flow from the upstream section to the downstream section.

The bottom flow panel can have a top edge or surface that is located above and is spaced apart from the top surface of the liquid contained within the bubble trap and thus prevents fluid from flowing between the upstream section to the downstream section at the surface of the liquid. However, the bottom flow panel has an opening below and spaced apart from the surface of the liquid and the opening affords for the liquid to flow from the upstream section to downstream section. In some instances the opening can be located between a bottom edge or surface of the bottom flow panel and a floor of the bubble trap, however this is not required.

Stated differently, the top flow panel allows fluid to flow over the panel from one section to another whereas a bottom flow panel allows fluid to flow under the panel from one section to another, the term "under the panel" defined as the flow of fluid from one section to another at a location that is below and spaced apart from the surface of the fluid in the bubble trap.

The panel can be a generally vertical panel or in the alternative be a panel having a generally sloping portion. It is appreciated that the term "vertical portion" is defined as a portion of the panel having a vertical orientation within +/−15 degrees. In addition, the term "generally sloping portion" is defined as a portion of the panel that slopes at an angle relative to a vertical orientation greater than 15 degrees.

The bubble trap can have an inlet and an outlet with a plurality of upstream sections and a plurality of downstream sections between the outlet and the inlet. It is appreciated that a particular downstream section can also be an upstream section with respect to a subsequent downstream section. As such, an upstream section is defined as a section of the bubble trap separated by a panel from an adjacent downstream section with fluid flowing from the upstream section to the downstream section as it passes from the inlet of the bubble trap to the outlet. In addition, the fluid can flow from the inlet to the outlet by alternately flowing under a bottom flow panel and over a top flow panel, or visa-versa.

Turning now to FIG. 1, a perspective view of a stereolithography machine is shown generally at reference numeral 10. The machine can have a vat 100, a table 110, a laser 120, a mirror 130, a liquid photopolymer 140 within the vat 100, a sweeper 150 and an elevator 160. The elevator 160 can move the table 110 in up and down direction 5 and the sweeper 150 can move in a generally horizontal back and forth direction 7. It is appreciated that the elevator 160 can be in the form of a pneumatic or hydraulic cylinder located below the table 110 and not necessarily as shown in FIG. 1.

Figure 2:
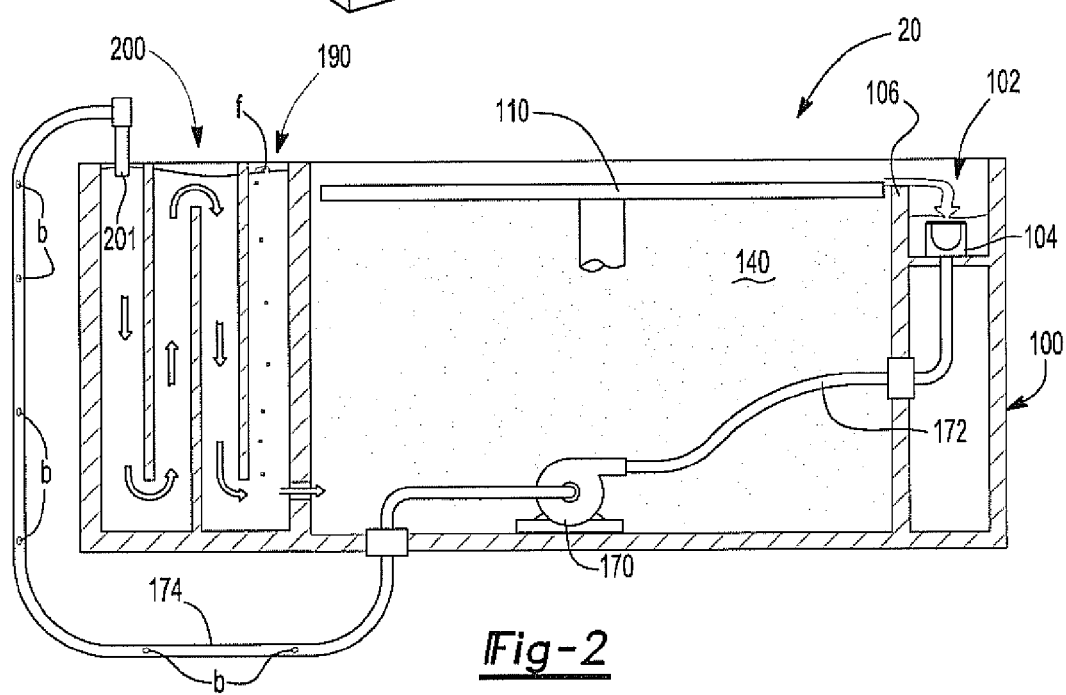
FIG. 2 is a side view of an embodiment of the present invention.
Figure 3:
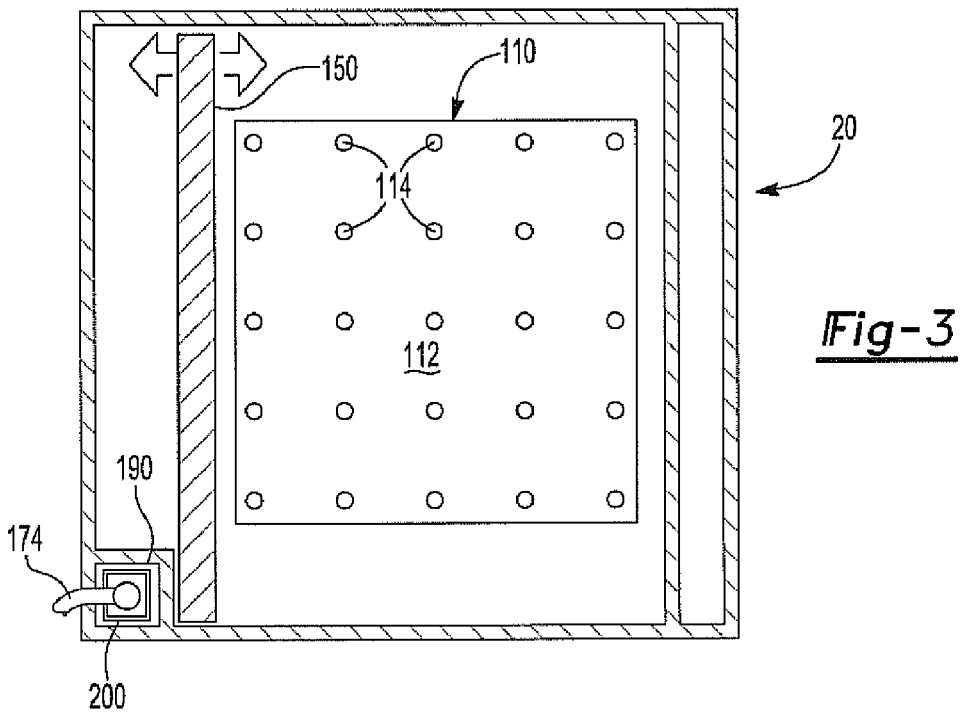
FIG. 3 is a top view of the embodiment shown in FIG. 2.

Turning now to FIGS. 2 and 3, a side view and a top view, respectively, of an embodiment of the present invention is shown generally at reference numeral 20. The embodiment 20 has the vat 100, the table 110 and the liquid photopolymer 140. In addition, the stereolithography machine 20 can have an overflow pit 102 that is separated from a main portion of the vat 100 by an overflow rail 106. When a portion of the liquid photopolymer 140 flows into the overflow pit 102, the liquid 140 can pass through an optional filter 104 and into an inlet line 172. The inlet line 172 can be in fluid communication with a pump 170 and the pump 170 can pump/force the liquid 140 through a discharge line 174 and into a bubble trap 200. It is appreciated that operation of the pump 170 can result in gas or air bubbles 'b' being introduced into the liquid 140.

The table 110 can have a platform surface 112 with one or more apertures 114 that afford for the liquid 140 to flow up through the surface 112 when the table 110 moves down into the vat 100 and/or when the sweeper 150 provides another layer of liquid over the table 110. In addition, a moat 190 can be located at least partially within the vat 100 and the bubble trap 200 can be located at least partially within the moat 190. It is appreciated that the bubble trap 200 and/or moat 190 are not necessarily shown or drawn to scale in the figures for teaching purposes.

Figures 4, 5A:
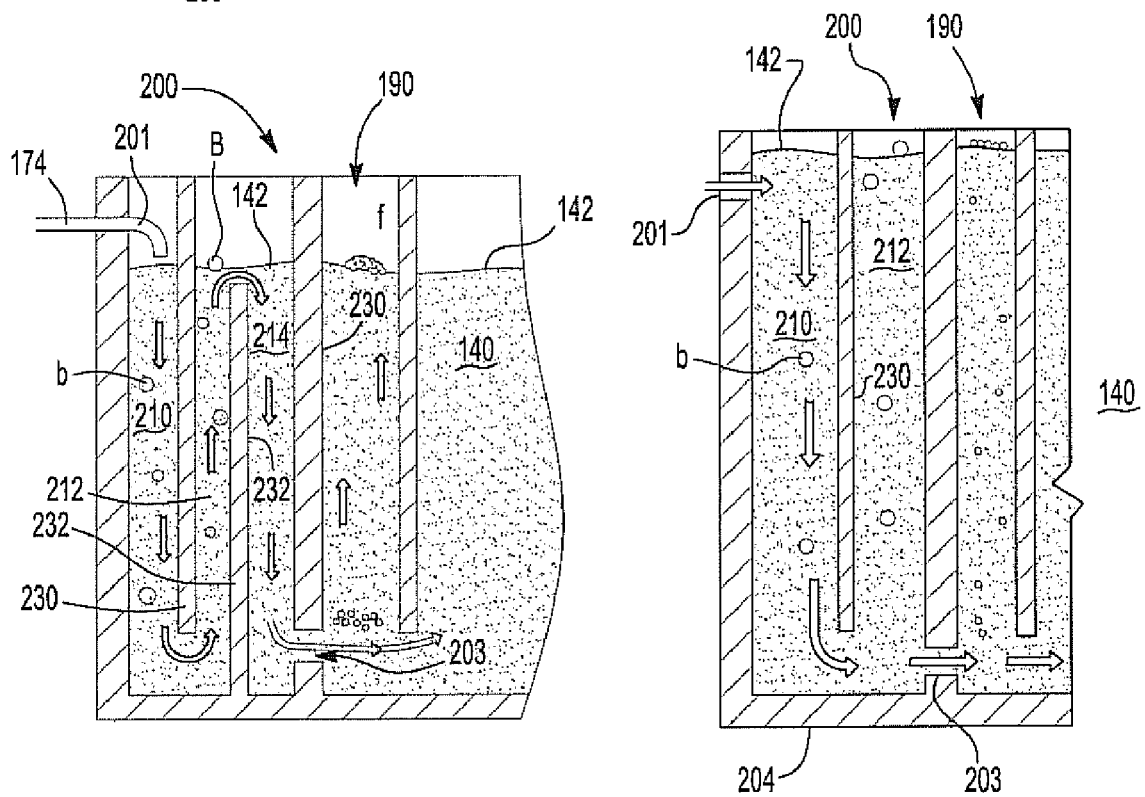
FIG. 4 is a side cross sectional view of a bubble trap and a moat according to an embodiment of the present invention.
FIG. 5A is a side cross sectional view of another embodiment of a bubble trap according to the present invention.

An enlarged view of the bubble trap 200 is shown in FIG. 4. The bubble trap 200 can have an inlet 201, an outlet 203 and one or more upstream sections and one or more downstream sections. In the particular embodiment shown in FIG. 4, the bubble trap 200 has an upstream section 210 and a downstream section 212 separated by a bottom flow panel 230. In addition, a downstream section 214 is separated from the section 212 by a top flow panel 232. Also illustrated in the figure is the flow of the liquid 140 through the inlet 201, downwardly through the upstream section 210, below or under the bottom flow panel 230, upwardly through the downstream section 212, over the top flow panel 232, downwardly through the downstream section 214 and out of the bubble trap through outlet 203.

Bubbles 'b' that flow through the bubble trap 200 rise to a top surface 142 of the liquid 140 in the bubble trap 200 and can be trapped there until they burst. It is appreciated that some of the bubbles can be small enough to continue to flow with the liquid 140 through the bubble trap 200. In such an event, the liquid 140 with the small bubbles can exit the trap 200, enter the moat 190 and the small bubbles can then flow or float up to a top surface 142 of the liquid 140 within the moat. These bubbles at the top surface 142 in the moat 190 may or may not collect as foam while the liquid 140 with a reduced amount of bubbles enters the vat 100. In this manner, the trap 200 and moat 190 afford for a reduction of bubbles that enter the vat 100.

Turning now to FIGS. 5A-5D, illustrative examples or embodiments for the bubble trap 200 are shown. For example, FIG. 5A illustrates the bubble trap 200 having a single bottom flow panel 230 between the upstream section 210 and the bottom stream section 212. In addition, the inlet 201 is located within a top region of the bubble trap 200, however this is not required, i.e. the inlet 201 can be located within a bottom or lower region of the trap 200. If the inlet 201 is present at a bottom or lower region, the outlet 203 would preferably be located in a top or upper region of the trap 200, or a top flow panel 232 would be present between the upstream section and the downstream section, such that the liquid 140 would be forced to flow at least through one section 210/212 and not simply under a bottom flow panel 230 before exiting the trap 200 through the outlet 203.

It can be desirable for the liquid 140 to have as much contact as possible with the bottom flow panel 230 and/or top flow panel 232 in order to allow any bubbles within the liquid to accumulate thereon. As such, FIG. 5B illustrates the bubble trap 200 having a plurality of bottom flow panels 230 and top flow panels 232 with a plurality of sections 210, 212, 214, 216 and 218 provided between the inlet 201 and the outlet 203. It is appreciated that the section 212 is a downstream section relative to the upstream section 210, but can be an upstream section relative to the downstream section 214. Likewise, the section 214 is a downstream section relative to section 212 and yet is an upstream section relative to section 216.

Referring to FIG. 5C, the bubble trap 200 has a bottom flow panel 240 with a generally vertical portion 242 and a generally sloping portion 244. In addition, a top flow panel 250 can be included with a generally vertical portion 252 and a generally sloping portion 254. It is appreciated that the generally sloping portions can aid in the accumulation, coalescence and floating of bubbles to the top surface 142 of the bubble trap 200. Turning to FIG. 5D, the bubble trap 200 can have a combination of generally vertical panels and generally sloping panels. In particular, a bottom flow panel 260 has one or more sloping portions 262, 264 and a top flow panel 270 has one or more sloping portions 272, 274. In addition, one or more generally vertical bottom flow panels 230 and/or top flow panels 232 may or may not be included.

In FIGS. 5A-5D, it is appreciated that the opening for the bottom flow panels is illustrated as an opening, space, etc., between a floor 204 of the bubble trap 200 and a bottom edge or surface of the panel. As stated above, this is not required and an opening can be located anywhere beneath and spaced apart from the top surface 142 of the liquid 140 such that desirable flow of the liquid 140 is achieved within the bubble trap 200.

Not being bound by theory, FIG. 6 illustrates two or more small bubbles 'b' accumulating and coalescing on a bottom flow panel 230 as function of time 't' and eventually forming a larger bubble 'B'. Once the larger bubble 'B' has formed, it can rise or float to the top surface 142 of the liquid 140 and have enough buoyancy such that it will not continue to flow with the fluid in a downwardly direction. As such the bubble 'B' remains at the top surface 142 and/or eventually pops/bursts. In this manner bubbles can be removed from the liquid and/or prevented or reduced from being present in the vat 100.

The reduction and/or elimination of the bubbles can afford for lower operating cost for a stereolithography machine due to less defects in manufactured parts and/or the ability to use the liquid polymer at higher viscosities relative to a machine with no bubble elimination or reduction system. For example and for illustrative purposes only, a photopolymer such as REN SHAPE® SL 7580 having an initial viscosity of 500 to 600 centipoise (cps) can be continually used with viscosities above 1,500 cps and thus increase the time between changing of the liquid polymer for a stereolithography machine.

It is appreciated that the embodiment shown in FIGS. 2 and 3 illustrates the moat 190 and trap 200 being located at least partially within the vat 100. However, this is not required. For example and for illustrative purposes only, FIG. 7 illustrates an embodiment 30 where the trap 200 and the moat 190 are located outside and spaced apart from the vat 100. The pump 170 can still pump the liquid 140 to the bubble trap 200 and the trap 200 can reduce and/or eliminate bubbles that are within the liquid 140. Thereafter, the liquid 140 can flow through the outlet 203 and enter the moat 190 through an inlet 196 where additional bubbles, that may or may not be small relative to bubbles removed in the trap 200, can float to the top surface 142 of the liquid 140 in the moat 190. In some instances, the bubbles that rise to the top surface 142 within the moat 190 can be present as foam.

Although FIG. 7 illustrates that the trap 200 is not located at least partially within the moat 190, it is appreciated that the trap 200 could be located at least partially within the moat 190. In addition, it is appreciated that the embodiments have been discussed in relation to a stereolithography machine, however the trap and moat can be used in combination with other fluid flowing systems in which the reduction and/or elimination of gas bubbles within a flowing fluid is desired.

The process for reducing and/or eliminating bubbles in a fluid flowing system can include providing a bubble trap and a moat as described above. A pump can afford for liquid to flow into and through an upstream section of the bubble trap, into and through a downstream section, into a moat and then into a vat. Gas bubbles in the liquid can accumulate and/or coalesce together on a surface of a panel located between the upstream section and the downstream section and form a relatively large bubble that floats to, and remains at, the top surface of the liquid within the trap and eventually pops/bursts. Any bubbles that are not removed within the bubble trap can exit the trap and enter the moat where they can float to the top surface of the liquid therein. In particular, a liquid that is continually used in a stereolithography machine can be pumped from the vat into the bubble trap, through the bubble trap into the moat, through the moat and back into the vat.

The bubble trap and/or the moat can be made from any material known to those skilled in the art, illustratively including metals, alloys, ceramics, plastics and the like. The invention is not restricted to the illustrated examples described above and such examples are not intended as limitations on the scope of the invention. Methods, apparatus, compositions and the like described herein are extemporary and not intended as limitations on the scope of the invention. Changes and uses will occur to those skilled in the art. The scope of the invention is defined by the scope of the claims.

I claim:

1. A bubble reduction system for a fluid flowing system comprising:
    a vat containing a liquid;
    a pump operable to pump said liquid into said vat;
    a moat containing a portion of said liquid;
    a bubble trap containing a portion of said liquid and having an upstream section and a downstream section, said bubble trap also having a generally vertical panel between said upstream section and said downstream section;
    wherein said liquid flows from said pump into said upstream section, from said upstream section into said downstream section, from said downstream section into said moat and from said moat into said vat.

2. The bubble reduction system of claim 1, wherein said vat is a stereolithography machine vat and said liquid is a liquid photopolymer.

3. The bubble reduction system of claim 1, wherein said moat has a sidewall with a moat discharge opening, said moat discharge opening located below a top surface of said liquid in said moat.

4. The bubble reduction system of claim 1, wherein said generally vertical panel is selected from the group consisting of a top flow panel and a bottom flow panel, said liquid flowing from said upstream section to said downstream section by flowing over said top flow panel or flowing under said bottom flow panel.

5. The bubble reduction system of claim 1, wherein said generally vertical panel has a generally vertical portion and a generally sloping portion.

6. The bubble reduction system of claim 1, wherein said bubble trap has an inlet, an outlet and a plurality of upstream sections and a plurality of downstream sections between said inlet and said outlet.

7. The bubble reduction system of claim 6, wherein said plurality of upstream sections are separated from said plurality of downstream sections by at least one top flow panel and at least one adjacent bottom flow panel, said liquid flowing from said inlet to said outlet by alternately flowing under said bottom flow panel and over said top flow panel.

8. The bubble reduction system of claim 1, wherein said moat is located at least partially within said vat, a top surface of said liquid in said moat at a same level as a top surface of said liquid in said vat.

9. The bubble reduction system of claim 1, wherein said bubble trap is located at least partially within said vat.

10. The bubble reduction system of claim 9, wherein said bubble trap is located at least partially within said moat.

11. A bubble reduction system for a stereolithography machine, the stereolithography machine having a liquid resin contained within a vat and a pump with an intake line and a discharge line, said pump operable to pump the liquid resin from the vat into the intake line and out of the discharge back into the vat, said bubble reduction system comprising:
    a moat having a sidewall with an opening; and
    a bubble trap having an inlet, an upstream section, a downstream section, a panel between said upstream section and said downstream section, and an outlet, said panel selected from the group consisting of a top flow panel and a bottom flow panel;
    wherein said intake line of said pump is in fluid communication with the liquid resin in the vat of the stereolithography machine and the discharge line is in fluid communication with said inlet of said bubble trap;
    the pump directs the liquid resin from the vat to said inlet of said bubble trap;
    the liquid resin flows through said inlet into said upstream section;
    the liquid resin flows from said upstream section into said downstream section by flowing over said top flow panel or below said bottom flow panel;
    the liquid resin flows from said downstream section into said moat; and
    the liquid flows from said moat into said vat.

12. The bubble reduction system of claim 11, wherein said bubble trap is located at least partially within said moat.

13. The bubble reduction system of claim 11, wherein said bubble trap has a plurality of upstream sections and a plurality of downstream sections, said plurality of upstream sections separated from said plurality of downstream sections by at least one top flow panel and at least one adjacent bottom flow panel and said liquid flowing from said inlet to said outlet by alternately flowing under said bottom flow panel and over said top flow panel.

14. The bubble reduction system of claim 11, wherein said panel is a generally vertical element.

15. The bubble reduction system of claim 11, wherein said panel has a generally vertical portion and a generally sloping portion.

16. A process for reducing bubbles in a liquid flowing system, the process comprising:
providing a vat;
providing a liquid;
providing a pump operable to pump the liquid into the vat;
providing a moat located at least partially in the vat and containing a portion of the liquid;
providing a bubble trap containing a portion of the liquid and having an upstream section and a downstream section, the bubble trap also having a panel between the upstream section and the downstream section;
pumping the liquid into the upstream section, the liquid entering the upstream section having gas bubbles;
wherein the liquid with gas bubbles flows from the upstream section into the downstream section, from the downstream section into the moat and from the moat into the vat; and
the gas bubbles coalescing together on a surface of the panel, floating to the top surface of the liquid in the bubble trap and bursting or floating to the top surface of the liquid contained in the moat and forming a foam.

17. The process of claim 16 wherein the liquid flowing system is a stereolithography machine and the liquid is a liquid photopolymer.

18. The process of claim 16, wherein the bubble trap is located at least partially within the moat.

* * * * *